US012780189B2

(12) United States Patent
Pereira

(10) Patent No.: US 12,780,189 B2
(45) Date of Patent: Nov. 3, 2026

(54) SYSTEMS AND METHODS FOR MOTION PLANNING WITH LONGITUDINAL CONSTRAINTS

(71) Applicant: Torc Robotics, Inc., Blacksburg, VA (US)

(72) Inventor: Savio Pereira, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 8 days.

(21) Appl. No.: 18/957,038

(22) Filed: Nov. 22, 2024

(65) Prior Publication Data

US 2026/0145672 A1 May 28, 2026

(51) Int. Cl.

*B60W 30/12* (2020.01)
*B60W 30/18* (2012.01)
*B60W 60/00* (2020.01)
*G01C 21/30* (2006.01)

(52) U.S. Cl.

CPC ...... *B60W 30/12* (2013.01); *B60W 30/18163* (2013.01); *B60W 60/0015* (2020.02); *G01C 21/30* (2013.01); *B60W 2520/06* (2013.01); *B60W 2520/10* (2013.01)

(58) Field of Classification Search

CPC ........... B60W 30/12; B60W 30/18163; B60W 60/0015; B60W 2520/06; B60W 2520/10; G01C 21/30

See application file for complete search history.

(56) References Cited

U.S. PATENT DOCUMENTS

| | | | |
|---|---|---|---|
| 11,648,935 B2 | 5/2023 | Sierra Gonzalez et al. | |
| 11,970,168 B2 | 4/2024 | Beller et al. | |
| 12,001,958 B2 | 6/2024 | Kamenev et al. | |
| 2017/0336788 A1* | 11/2017 | Iagnemma | G05D 1/0038 |
| 2018/0186378 A1* | 7/2018 | Zhuang | B60W 30/18163 |
| 2018/0315314 A1 | 11/2018 | Gilsenan et al. | |
| 2021/0146963 A1 | 5/2021 | Li et al. | |
| 2024/0262366 A1 | 8/2024 | Takashima et al. | |

* cited by examiner

*Primary Examiner* — Jason Holloway
*Assistant Examiner* — Godfrey Aleksander Maciorowski
(74) *Attorney, Agent, or Firm* — McCarter & English, LLP

(57) ABSTRACT

Systems and techniques are described herein for motion planning for autonomous vehicles. For example, a computing device can generate a hash map including keys associated with time steps and values associated with a nested hash map, the nested hash map including one or more lane coordinates and a list of trajectory constraints associated with the one or more lane coordinates; receive a plurality of candidate trajectories associated with a vehicle; query the hash map to determine violations of the list of trajectory constraints by one or more candidate trajectories of the plurality of candidate trajectories; and select a candidate trajectory from the plurality of candidate trajectories based on the violations of the list of trajectory constraints.

15 Claims, 7 Drawing Sheets

100

SYSTEMS AND METHODS FOR MOTION PLANNING WITH LONGITUDINAL CONSTRAINTS

TECHNICAL FIELD

The field of the disclosure relates generally to autonomous vehicles and, more specifically, systems and methods for motion planning with longitudinal constraints.

BACKGROUND OF THE INVENTION

Autonomous and semi-autonomous vehicles have become increasingly prevalent as more vehicles implement various technologies for providing autonomous control of vehicles. Many autonomous vehicles employ various technologies such as, perception, localization, behavior planning, motion planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies can use inertial navigation system (INS) data. Behavior planning and motion planning technologies determine how to move through the sensed environment to reach a planned destination. Behavior planning and motion planning technologies process data representing the sensed environment and localization or mapping data to plan maneuvers and routes to reach the planned destination for execution by a controller or a control module. Controller technologies can use control theory to determine how to translate desired behaviors and trajectories into actions undertaken by the vehicle through its dynamic mechanical components. For example, control technologies can include steering, braking and acceleration.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

The following presents a summary relating to one or more aspects disclosed herein. The following summary should not be considered an extensive overview relating to all contemplated aspects, nor should the following summary be considered to identify key or critical elements relating to all contemplated aspects or to delineate the scope associated with any particular aspect. Accordingly, the following summary has presents certain concepts relating to one or more aspects relating to the mechanisms disclosed herein in a simplified form to precede the detailed description presented below.

In some aspects, a system for motion planning is provided. The system can include at least one memory configured to store machine executable instructions; one or more processors coupled with the at least one memory and configured, upon execution of the machine executable instructions, to: generate a hash map including keys associated with time steps and values associated with a nested hash map, the nested hash map including one or more lane coordinates and a list of trajectory constraints associated with the one or more lane coordinates; receive a plurality of candidate trajectories associated with a vehicle; query the hash map to determine violations of the list of trajectory constraints by one or more candidate trajectories of the plurality of candidate trajectories; and select a candidate trajectory from the plurality of candidate trajectories based on the violations of the list of trajectory constraints.

In some aspects, a method for motion planning is provided. The method can include: generating a hash map including keys associated with time steps and values associated with a nested hash map, the nested hash map including one or more lane coordinates and a list of trajectory constraints associated with the one or more lane coordinates; receiving a plurality of candidate trajectories associated with a vehicle; querying the hash map to determine violations of the list of trajectory constraints by one or more candidate trajectories of the plurality of candidate trajectories; and selecting a candidate trajectory from the plurality of candidate trajectories based on the violations of the list of trajectory constraints.

In some aspects, a non-transitory computer-readable medium having stored thereon instructions that, when executed by at least one processor, cause the at least one processor to: generate a hash map including keys associated with time steps and values associated with a nested hash map, the nested hash map including one or more lane coordinates and a list of trajectory constraints associated with the one or more lane coordinates; receive a plurality of candidate trajectories associated with a vehicle; query the hash map to determine violations of the list of trajectory constraints by one or more candidate trajectories of the plurality of candidate trajectories; and select a candidate trajectory from the plurality of candidate trajectories based on the violations of the list of trajectory constraints.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
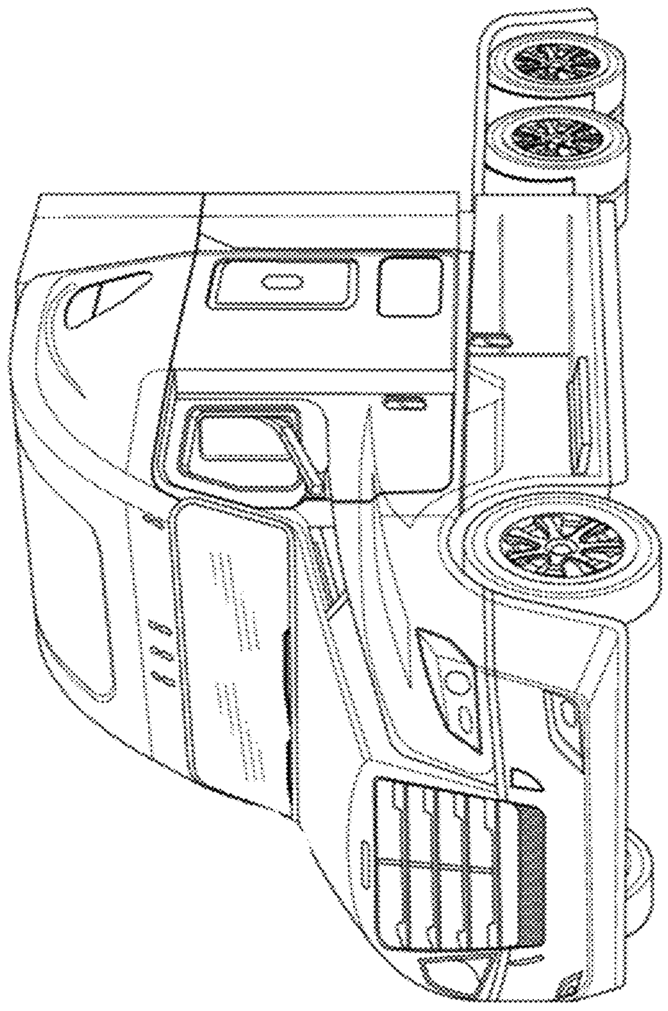
FIG. 1. is a schematic view of an autonomous truck, in accordance with some aspects of the disclosure.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

Some structural or method features may be shown in specific arrangements and/or orderings in the drawings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

An autonomous vehicle is a vehicle able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA). A semi-autonomous vehicle is a vehicle able to perform some of the driving related operations such as keeping the vehicle in lane and/or parking the vehicle without human intervention. A semi-autonomous vehicle has an autonomy level of level-1, level-2, or level-3 recognized by NHTSA. A non-autonomous vehicle is a vehicle that is neither an autonomous vehicle nor a semi-autonomous vehicle. A non-autonomous vehicle has an autonomy level of level-0 recognized by NHTSA.

Many autonomous and semi-autonomous vehicles use onboard or offboard processors to generate motion plans for the vehicles based on sensor data collected by sensors of the vehicle. For example, autonomous and semi-autonomous vehicles can include various cameras, optical sensors, image sensors, light detection and ranging (LIDAR), radio detection and ranging (RADAR) sensors, etc. to identify objects, traffic, weather, and other obstacles present in an environment. Many autonomous vehicles process the sensor data to generate motion plans the autonomous vehicle or semi-autonomous vehicle can use to navigate an environment.

The motion plans generated by autonomous and semi-autonomous vehicles can include various predetermined constraints to ensure passenger safety and comfort. For example, autonomous vehicles can generate motion plans with constraints such as, how fast the autonomous vehicle can operate, a distance to keep between the autonomous vehicle and a leading vehicle, i.e., an "other motor vehicle" (OMV), how fast the autonomous vehicle can switch lanes, speed at which the autonomous vehicle can turn, allowable braking patterns of the autonomous vehicle, etc.

In some examples, motion plans can be generated by a motion planning component (e.g., a processor, computing system, or software module executing on a processor or computing system) of the autonomous or semi-autonomous vehicle for generating motion plans). The motion planning component can generate trajectories for the autonomous or semi-autonomous vehicle to follow. The motion planning component can generate motion plans based on information (e.g., sensor data) from upstream components such as components for perception (e.g., sensors), other motor vehicle predictions (also referred to actor prediction) and mapping components (e.g., navigation components).

Systems, apparatuses, methods, and computer-readable media (collectively referred to as "systems and methods") are described herein that can be used to provide longitudinal OMV constraints to motion planning of an autonomous or semi-autonomous vehicle. "Longitudinal" refers to the front-to-rear dimension of the autonomous or semi-autonomous vehicle. Longitudinal constraints, accordingly, refers to constraints pertaining to the space ahead of or behind the autonomous or semi-autonomous vehicle. Safety and comfort of planned trajectories of motion plans can be achieved by imposing constraints on generated trajectories within the motion planning component. The constraints can be determined based on rules and norms of driving. The constraints can further be based depend on data associated with the predicted future states of OMVs and on the geometry of the road network in the vicinity of the autonomous vehicle.

In some examples, the motion planning component can compare various trajectories of the autonomous vehicle and evaluate the trajectories based on constraints, including safety constraints, comfort constraints, vehicle type constraints, vehicle weight constraints, etc. The motion planning component can select a trajectory from a plurality of trajectories having the least constraint violations (e.g., the trajectory/motion plan most compliant with the safety and comfort constraints of the motion planning component).

In some examples, the motion planning component can evaluate an extent to which a constraint is violated. For example, following a leading vehicle too closely (e.g., following a distance shorter than a predetermined leading vehicle spacing constraint) can be a constraint measured as a binary violation or measured on a spectrum indicating an extent to which the constraint was violated. For example, when the leading vehicle spacing constraint is measured as a binary constraint, the motion planning component can determine any distance of the autonomous or semi-autonomous vehicle to a leading vehicle below a predetermined distance threshold is a violation. In another example, when the leading vehicle spacing constraint is measured on a spectrum indicating an extent to which the constraint is violated, the motion planning component can determine that a trajectory that violates the leading vehicle spacing constraint by 1 foot can be determined as preferable to a trajectory that violates the leading vehicle spacing constraint by 2 feet. The motion planning component can select the motion plan that violates the leading vehicle spacing constraint by 1 foot over the motion plan that violates the leading vehicle spacing constraint by 2 feet.

In further examples, a subset of constraints associated with predicted future states of other motor vehicles can be referred to as OMV constraints. An example of an OMV constraint can include: the autonomous vehicle should maintain a safe longitudinal distance from any OMV directly ahead of the autonomous vehicle (e.g., the leading vehicle spacing constraint). In another example OMV constraint: the autonomous vehicle should not cut in too close in front of another OMV. The OMV constraints related to the relative longitudinal positioning between the autonomous vehicle and surrounding OMVs can be referred to as longitudinal OMV constraints.

The location and trajectories of the autonomous vehicle and the OMVs can be dynamic, because both can be in motion and additional OMVs can be detected as the autonomous vehicle travels along a route. The longitudinal OMV constraints and other OMV constraints can be evaluated at various timesteps along a planned trajectory (e.g., at various timesteps of a motion plan). Further, because the motion planning component selects a trajectory/motion plan from a plurality of trajectories/motion plans and each motion trajectory/motion plan can include upwards of a hundred timesteps per trajectory, evaluating OMV constraints can be a resource-intensive process. Improvements to the efficiency in performing this process can allow current autonomous vehicle processors to perform motion planning with fewer resources, further allowing more types of processors (e.g., less powerful processors) and other computing devices to be used by the autonomous vehicle to perform motion planning. Further, improvements in efficiency in selecting motion plans/trajectories improves latency. The autonomous vehicle operates in motion, therefore improvements in latency can allow the autonomous vehicle to perform actions faster, which can allow the autonomous vehicle to operate more safely (e.g., by improving response times of the autonomous vehicle).

In certain embodiments, the motion planning component can use various data structures, routines, and functions to perform motion planning with longitudinal constraints. For example, individual longitudinal OMV constraints can be represented as data structures including an identifier of a lane of a road to which the longitudinal OMV constraint applies. For example, an autonomous vehicle can operate on a highway with four lanes. In such an example, the OMV constraints of each lane of the highway can have a different identifier and different longitudinal OMV constraints. In some examples, the lanes of the road can have unique identifiers associated with the lane and road. For example, the unique identifiers can be associated with a map that can include a coordinate system particular to the road. In such an example, each lane or portion of the lane of a road can be assigned a coordinate particular to the lane irrespective of the position of the autonomous vehicle. For example, multiple autonomous vehicles at different locations on a road can use the same coordinate system. In some examples, the coordinate system of the road is based on the location of the autonomous vehicle on the road.

In certain embodiments, the data structure including the longitudinal OMV constraints of a lane of the road further includes a current distance along the lane from the rear bumper of the OMV (e.g., where the OMV is a leading vehicle) to the start of the lane (e.g., as defined in the predetermined coordinate system of the road). The data structure can further include other kinesis of the OMV (e.g., acceleration, longitudinal velocity of the OMV and autonomous vehicle, etc.).

In certain embodiments, the ID for a lane can be a tuple including a road ID (e.g., an identifier associated with the road the lane ID is associated with) and the index of the lane within that road (e.g., lane 1, lane 2, etc.). By way of example, within a given road the left most lane can have an index of 1 and the index increments from left to right (e.g., in a three lane road the left most lane is lane 1, the middle lane is lane 2, and the right most lane is lane 3).

OMVs can move dynamically over a motion plan because the OMV can be at different positions and move at different velocities over a time period for performing a motion plan or generating a motion plan. Each OMV can have different longitudinal OMV constraints at different timesteps of a planning horizon of the motion plan (e.g., the timesteps the motion plan is to be performed). By generating a data structure to facilitate more efficient lookup of the longitudinal OMV constraints, the autonomous vehicle can more efficiently determine which predicted trajectories/motion plans violate a fewer number of constraints. The autonomous vehicle can select the motion plan with the fewer number of constraints and perform the motion plan.

In some examples, the data structure to facilitate more efficient lookup of the longitudinal OMV constraints is a hash map including a predicted timestep as a key and a child hash map (e.g., a nested hash map) as a value of an associated predicted timestep. The child hash map for each predicted timestep can include data associated with the ID of a lane as a key and a list of longitudinal OMV constraints corresponding to the ID of the lane at the associated timestep as a value.

The motion planning component can generate trajectories (also referred to throughout as motion plans) that can include a sequence of waypoints (e.g., predicted position of the autonomous vehicle on the road at a predicted time step) over a predetermined time horizon. In some examples, the motion planning component can generate hundreds or thousands of trajectories (e.g., 500, 750, 1000, 2000, etc.) with each trajectory including a sequence of waypoints over the predetermined time horizon. The motion planning component can generate trajectories multiple times a second or at a predetermined frequency. By way of a non-limiting example, the motion planning component can generate trajectories 5 to 20 times a second. Time steps of the time horizon can be divisions of the time horizon into equal periods of time (e.g., time steps of 0.1 seconds, 0.05 seconds, 0.01 seconds, etc.).

In some examples, the time horizon can be 12 to 15 seconds. In alternative embodiments, the time horizon may be less than 12 seconds, e.g., 6-10 seconds, or greater than 15 seconds, e.g., 25-30 seconds. Each waypoint can include a timestep and information associated with a predicted pose, curvature, velocity, and acceleration of the autonomous vehicle at the waypoint. In further examples, the waypoint can include lane coordinates associated with the waypoint. In some examples, the lane coordinates are a tuple including values associated with an ID of the lane the waypoint is in, a distance of the waypoint along the lane from the start of the lane, and a distance of the waypoint from a centerline of the lane (e.g., the centerline dividing the lane substantially in half in the direction of the movement of the autonomous vehicle). In some examples, the distance of the autonomous vehicle to the right of the centerline are positive and the distance of the autonomous vehicle to the left of the centerline are negative. The waypoints can be uniformly spaced apart in time (e.g., such as with a resolution of 0.1 seconds).

The disclosed autonomous vehicle, or systems and components thereof, can look up the longitudinal OMV constraints at a nearest predicted timestep. The lookup can have a constant time complexity (i.e., can be processed generally within an equivalent period of time by the autonomous vehicle or component thereof) because the predicted timesteps are uniformly spaced in time and stored in ascending order (i.e., subsequent predicted timesteps in time are stored in temporal order). The autonomous vehicle, or a component thereof can look up constraints corresponding to the lane of the waypoint of the motion plan/trajectory. For example, because the constraints corresponding to the lane ID are stored within the hash map with the waypoint, the lookup of the constraints is more efficient. The lookup of the constraints can have a constant time complexity because the autonomous vehicle, or component thereof, can perform the look up within the hash map by a key associated with the lane ID.

When the autonomous vehicle has determined the longitudinal OMV constraints for a lane at a timestep, the autonomous vehicle can evaluate violations of the longitudinal OMV constraints. Violations can vary in extent (i.e., severity or degree). For example, following too closely (e.g., a distance shorter than a predetermined distance threshold) to a leading vehicle by one foot can be determined to be lower in severity than following too closely by a yard. Formulations for evaluating violations can differ based on which longitudinal OMV constraint is violated. For example, a longitudinal OMV constraint for buffer distances between a leading vehicle and the autonomous vehicle can vary based on the velocity of the leading vehicle and the velocity of the autonomous vehicle. In some examples, additional variables can be added to the formulation, such as weather conditions that can affect how fast the autonomous vehicle can slow down (e.g., rain, ice, snow, etc.) or conditions of the road (e.g., gravel, cement, etc.). An example buffer distance calculation can include: $BD=c_1 \cdot V_{SDT}+c_2 \cdot (V_{SDT}-V_{OMV})$. Where, BD is the buffer distance, $V_{SDT}$ is the velocity of the vehicle, $V_{OMV}$ is the velocity of the OMV, and $c_1$ and $c_2$ are configurable parameters, or coefficients.

The autonomous vehicle, or a component thereof, can determine whether a longitudinal OMV constraint is violated based on a comparison of the predicted location of the autonomous vehicle and a predicted location of the OMVs of a lane. For example, where the longitudinal OMV constraint is a buffer distance, the autonomous vehicle can determine the distance from a rear bumper of the leading vehicle and the front bumper of the autonomous vehicle. For example, because the autonomous vehicle has determined the distance of the rear bumper of the leading vehicle from the start of the lane as stored in the longitudinal OMV constraint data structure, and the autonomous vehicle has determined the distance of the waypoint from the start of the lane as stored in the data structure associated with the waypoint, the buffer distance can be determined by subtracting the distances. The difference between the distances is the bumper-to-bumper distance between the autonomous vehicle and the leading vehicle. If the bumper-to-bumper distance is negative, the autonomous vehicle is ahead of an OMV (e.g., because the OMV is behind the autonomous vehicle, the OMV is not a leading vehicle). When the bumper-to-bumper distance is positive, the extent of the violation can be determined based on a subtraction of the buffer distance and the bumper-to-bumper distance.

In certain embodiments, the longitudinal OMV constraints can be determined based on predicted future states of OMVs. For example, the autonomous vehicle can generate the constraints before performing lookups of motion plans using the hash maps. The autonomous vehicle, or a component thereof, can determine the OMV constraints iteratively starting with a first OMV and determining longitudinal OMV constraints iteratively for each detected OMV. The autonomous vehicle, or component thereof, can determine longitudinal OMV constraints of predicted states of each OMV (e.g., predicted position and predicted velocity of OMVs for subsequent time steps) in chronological order (e.g., ordered temporally).

The autonomous vehicle, or a component thereof, can determine an associated lane for a predicted state of the OMV and determine a distance of the rear bumper of the leading vehicle from the autonomous vehicle or the start of the lane. In some examples, the autonomous vehicle, or a component thereof, can determine the distance of the rear bumper based on a projection of the rear bumper point onto the reference centerline of the lane. The autonomous vehicle can perform a backwards breadth first traversal along a semantic map for a configured maximum distance starting from the rear bumper of the OMV. For example, the key-value pairs of the nested hash map are associated with OMV constraints and a lane section of a road. The autonomous vehicle can perform a backwards breadth (e.g., starting with a key-value pair of the nested hash map associated with the configured maximum distance) first and determine OMV constraints. The autonomous vehicle can update the nested hash map with the OMV constraints associated with a section of a lane at the configured maximum distance. The autonomous vehicle can iterate from the sections of lanes at the configured maximum distance to sections of lanes closer to the autonomous vehicle and update the nested hash map with OMV constraints associated with the sections of lanes closer to the autonomous vehicle. For each lane along the backwards traversal, the autonomous vehicle, or component thereof determining the OMV constraints, can store a longitudinal OMV constraint associated with the timestep of the hash map. The autonomous vehicle can update the key-value pair of the nested hash map with determined OMV constraints in order of distance from the autonomous vehicle.

Determining the OMV constraints and storing the OMV constraints in a hash map to evaluate trajectories for motion planning can provide more efficient usage of computing resources as compared to traditional motion planning techniques. For example, traditional motion planning techniques can require determining constraints for each individual trajectory. Traditional motion planning techniques can determine substantially the same constraint multiple times for similar trajectories, wasting computing resources. Systems and techniques using the OMV hash map can reduce wasting computing resources by avoiding duplicative operations such as determining OMV constraints multiple times for multiple trajectories. Additionally, because systems and techniques using the OMV hash map for trajectory selection and evaluation can evaluate trajectories more efficiently, processors and other computing devices with lower processing power can be used to perform the trajectory selection and evaluation. The reduction in necessary processing power can increase the number and types of processors that can be used to perform trajectory selection and evaluation for autonomous vehicles.

FIG. 1 illustrates a vehicle 100, such as a truck that may be conventionally connected to a single or tandem trailer to transport the trailer (not shown) to a desired location. The vehicle 100 includes a cabin 114 that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin 114.

The vehicle 100 may be an autonomous vehicle, in which case the vehicle 100 may omit the steering wheel and the steering column to steer the vehicle 100. Rather, the vehicle 100 may be operated by an autonomy computing system (not shown) of the vehicle 100 based on data collected by a sensor network (not shown in FIG. 1) including one or more sensors.

Figure 2:
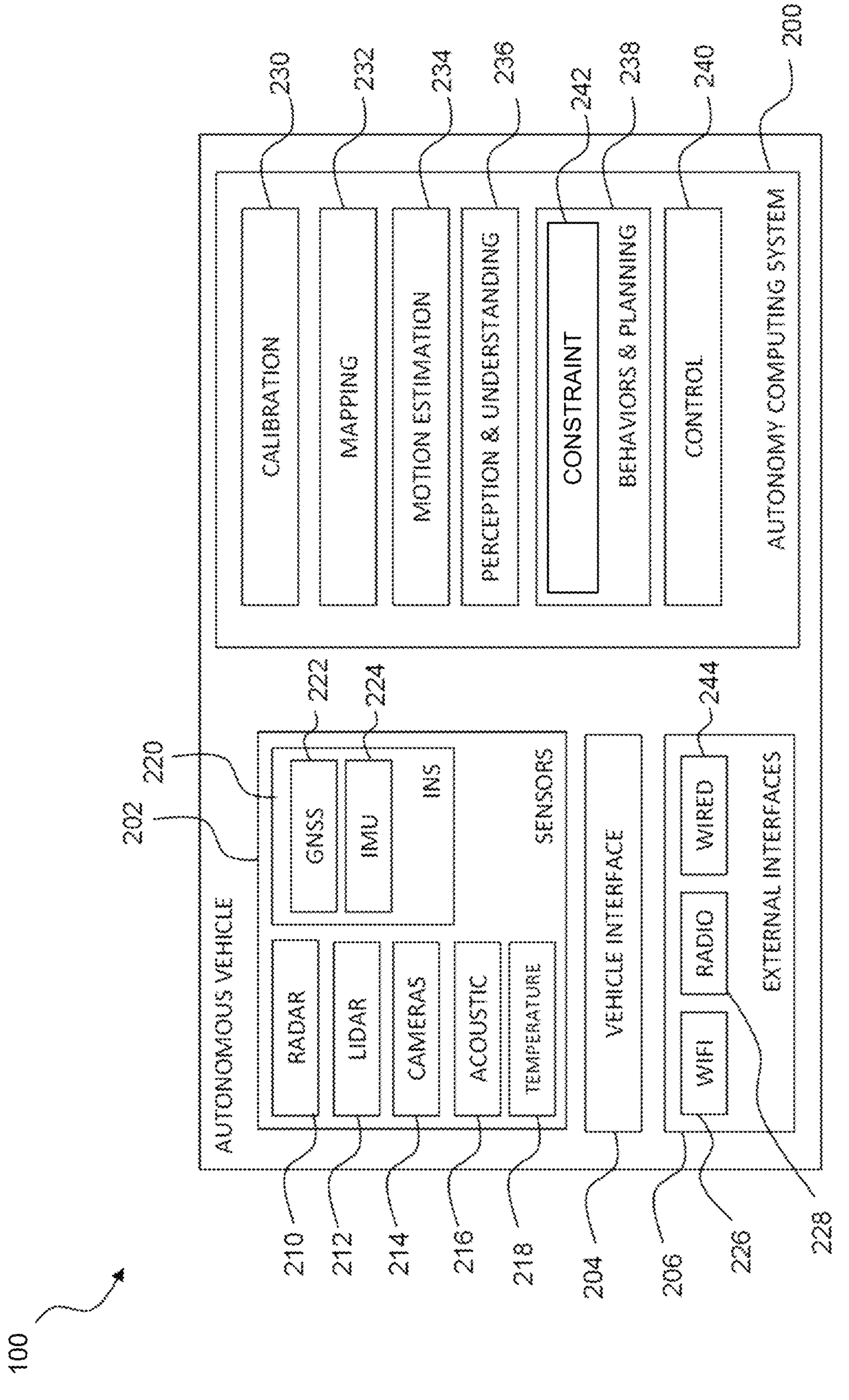
FIG. 2 is a block diagram of the autonomous truck shown in FIG. 1, in accordance with some aspects of the disclosure.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers or other objects in the environment surrounding autonomous vehicle 100. In some embodiments, the image data generated by cameras 214 may be sent to autonomy computing system 200 or other aspects of autonomous vehicle 100 or a hub or both.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, BLUETOOTH®, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a constraint module 242. The constraint module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100. For example, a motion planning module embodied within behaviors and planning module 238 may include constraint module 242 and, when embodied as a software module executing on a processor or computing system such as autonomy computing system 200, functions as the motion planning component described herein.

The constraint module 242 can perform one or more tasks including, but not limited to generating trajectory constraints such as longitudinal OMV constraints, storing the trajectory constraints in a data structure such as a tuple with additional information captured by the sensors 220 of the autonomous vehicle, and performing lookups of the hash map to select a motion plan based on motion plan violations of the trajectory constraints. For example, motion planning module 238 can generate a plurality of trajectories (e.g., hundreds, thousands, or more) that the constraint module 242 can compare against generated OMV constraints. In such an example, waypoints of a trajectory can be evaluated by comparing a predicted position and predicted velocity (e.g., the position and the velocity associated with the trajectory) of the autonomous vehicle 100 to perform the trajectory to the OMV constraints associated with locations of the waypoints. The constraint module 242 can compare the predicted position and predicted velocity to the OMV constraints generated by the constraint module 242 to determine violations of the OMV constraints. For example, a trajectory can include switching lanes 15 feet behind an OMV. When the OMV constraint includes a buffer distance of 20 feet, the trajectory including switching lanes 15 feet behind the OMV can be associated with a violation of the buffer distance by 5 feet. Multiple trajectories can be evaluated based on the OMV constraints to determine a trajectory with fewer violations. In some examples, the trajectory with fewer violations can be selected by the autonomy computing system 200 as the trajectory for the autonomous vehicle 100 to perform.

Figure 3:
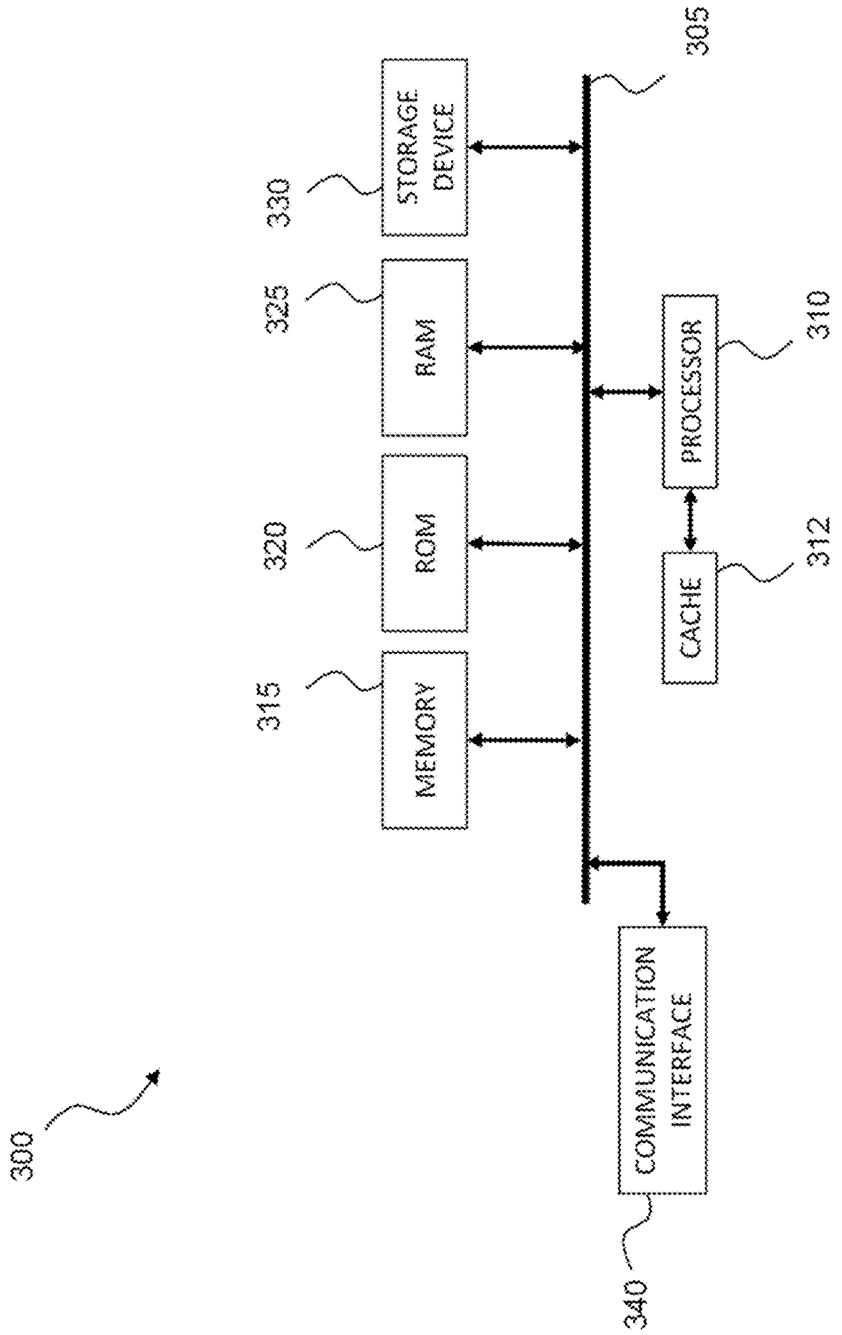
FIG. 3 is a block diagram of an example computing system, in accordance with some aspects of the disclosure.

FIG. 3 illustrates an example computing system 300 that can implement various techniques, processes, functions, or methods described herein. The components of computing system 300 are shown in electrical communication with each other using a connection 305, such as a bus. The example computing system 300 includes a processing unit (CPU or processor) 310 and a computing device connection 305 that couples various computing device components, including computing device memory 315, such as a read only memory (ROM) 320 and a random access memory (RAM) 325, and communication interface 340 to processor 310.

Computing system 300 can include a cache 312 of high-speed memory connected directly with, in close proximity to, or integrated as part of processor 310. Computing system 300 can copy data from memory 315 and/or storage device 330 to cache 312 for quick access by processor 310. In this way, cache 312 can provide a performance boost that avoids processor 310 delays while waiting for data. These and other modules can control or be configured to control processor 310 to perform various actions. Other computing device memory 315 may be available for use as well. Memory 315 can include multiple different types of memory with different performance characteristics. Processor 310 can include any general purpose processor, central processing unit (CPU), or graphics processing unit (GPU) in combination with a hardware or software provision configured to control processor 310 and stored in storage device 330, as well as any special-purpose processor where software instructions are incorporated into the processor design. Processor 310 may be a self-contained system, containing multiple cores or processors, a bus, memory controller, cache, etc. A multi-core processor may be symmetric or asymmetric.

Storage device 330 is a non-volatile memory and can be one or more of a hard disk or other types of computer readable media that can store data that are accessible by a computer, such as a magnetic cassette, flash memory card, solid state memory device, digital versatile disk, cartridge, RAM 325, ROM 320, or hybrids thereof. Memory 315 or storage device 330 can include software, code, firmware, etc., for controlling processor 310. Other hardware or software modules are contemplated. Memory 315 and storage device 330 are connected to computing device connection 305. In one aspect, a hardware module that performs a particular function can include the software component stored in a computer-readable medium in connection with the necessary hardware components, such as processor 310, computing device connection 305, and so forth, to carry out the function. In the example embodiment, processor 310 may be programmed by encoding an operation or function using one or more executable instructions and providing the executable instructions in memory 315 or storage device 330.

Figure 4:
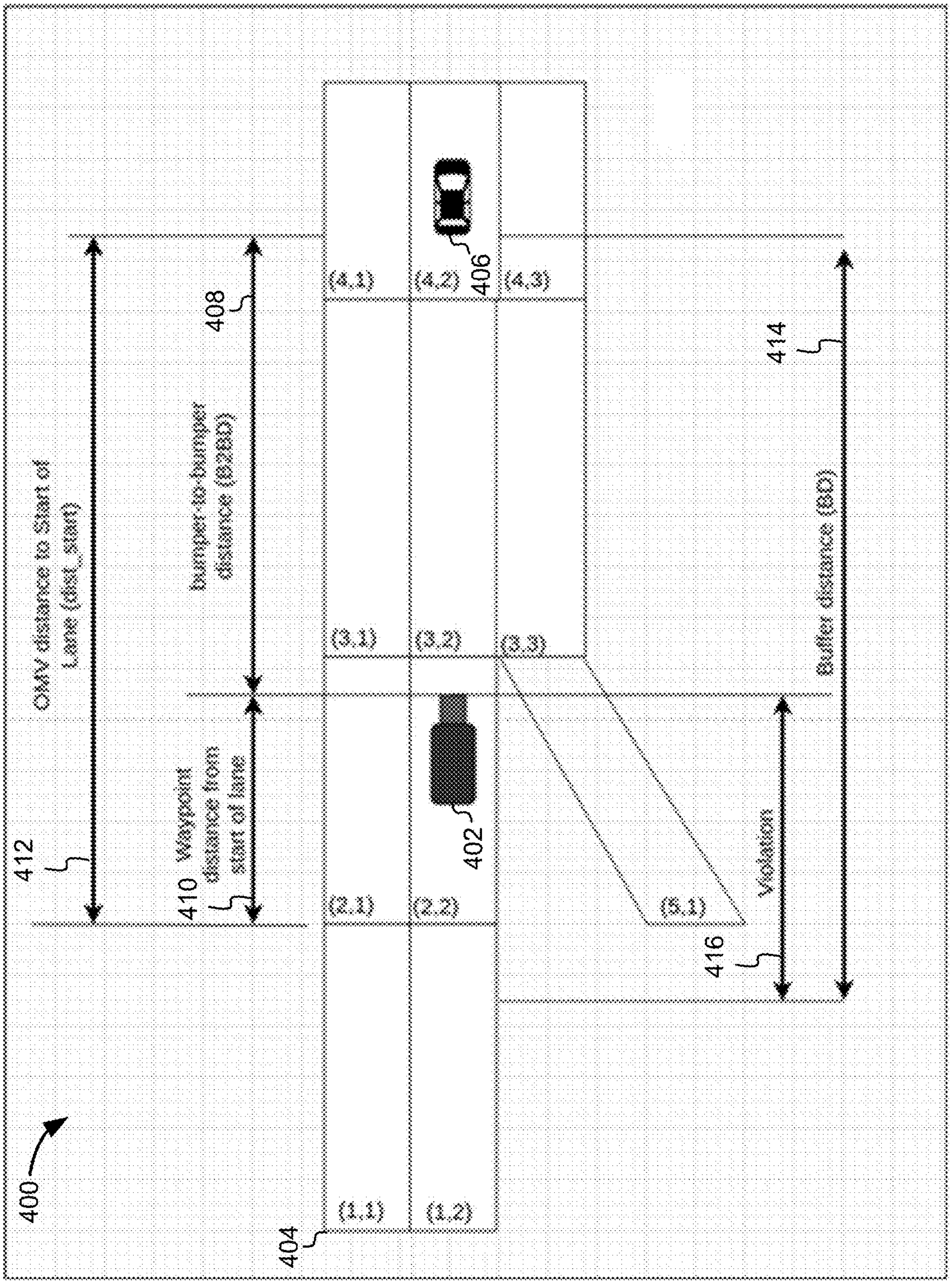
FIG. 4 is an illustration of an autonomous truck using longitudinal other motor vehicle (OMV) constraints, in accordance with some aspects of the disclosure.

FIG. 4 is an illustration of a vehicle 402 (e.g., an autonomous or semi-autonomous vehicle such as the vehicle 100 from FIG. 1) employing longitudinal OMV constraints to determine a motion plan/trajectory to execute. Vehicle 402 operates within a lane coordinate system 404 and along with an OMV 406. The OMV 406 is a leading vehicle because the OMV 406 is positioned in front of the vehicle 402.

The lane coordinate system 404 includes a first coordinate associated with a section of the lane (e.g., section 1, section 2, and section 3) and a second coordinate associated with a lane of the road (e.g., lane 1, lane 2, and lane 3). In some examples, the lane coordinate system 404 is predetermined based on a map of the road. For example, the lane coordinate system 404 can be associated with a map including coordinates for section of lanes of multiple roads. In such an example, the lane coordinate system 404 can represent an absolute coordinate system (e.g., the same coordinate system can be used for multiple autonomous vehicles). In some examples, the coordinate system 404 is generated using a high definition (HD) map or global positioning system (GPS). In other examples, the lane coordinate system 404 can be a relative coordinate system with the coordinates being relative to the position of the vehicle 402.

FIG. 4 further illustrates various measurements performed by the vehicle 402 or components thereof, e.g., autonomy computing system 200 or, more specifically, constraint module 242 shown in FIG. 2. For example, the vehicle 402 can determine a bumper-to-bumper distance (B2BD) 408 from a front bumper of the vehicle 402 to the back bumper of the OMV 406. In some examples, the vehicle 402 can use various sensors, such as cameras, optical sensors, image sensors, LIDAR, RADAR sensors, etc., to determine distances between the vehicle 402 and the OMV 406. In some examples, the vehicle 402 can use the various sensors to determine distances between the vehicle 402 and multiple OMVs.

The vehicle 402, or components thereof, can further determine distances between the vehicle and lanes of the road. For example, the vehicle 402 can measure a distance between the front bumper (or other reference point) of the vehicle 402 and the start of a waypoint from the start of a section of a lane of a road (also referred to as a waypoint distance 410 the start of a lane). In some examples, the vehicle 402 can determine distances based on summations of previous distances measurements. For example, the vehicle 402 can determine an OMV distance 412 to the start of the lane by summing the waypoint distance 410 from the start of a lane and the bumper-to-bumper distance 408.

By way of non-limiting example, FIG. 4 illustrates an example longitudinal constraint. The longitudinal constraint illustrated in FIG. 4 is a bumper-to-bumper distance constraint 414. The bumper-to-bumper distance constraint 414 can represent a buffer distance constraint associated with how far the vehicle 402 should be behind a leading vehicle (e.g., the OMV 406). The difference in distance between the bumper-to-bumper distance constraint 414 and the position of the vehicle 402 represents a violation 416 of the bumper-to-bumper distance constraint 414. For example, the violation 416 can vary in extent, or degree, based on how close the vehicle 402 is to the OMV 406. In such an example, the violation 416 can be a value associated with an extent of the violation 416 (e.g., the closer the vehicle 402 is to the OMV 406, the greater the value representing the violation 416).

Figure 5:
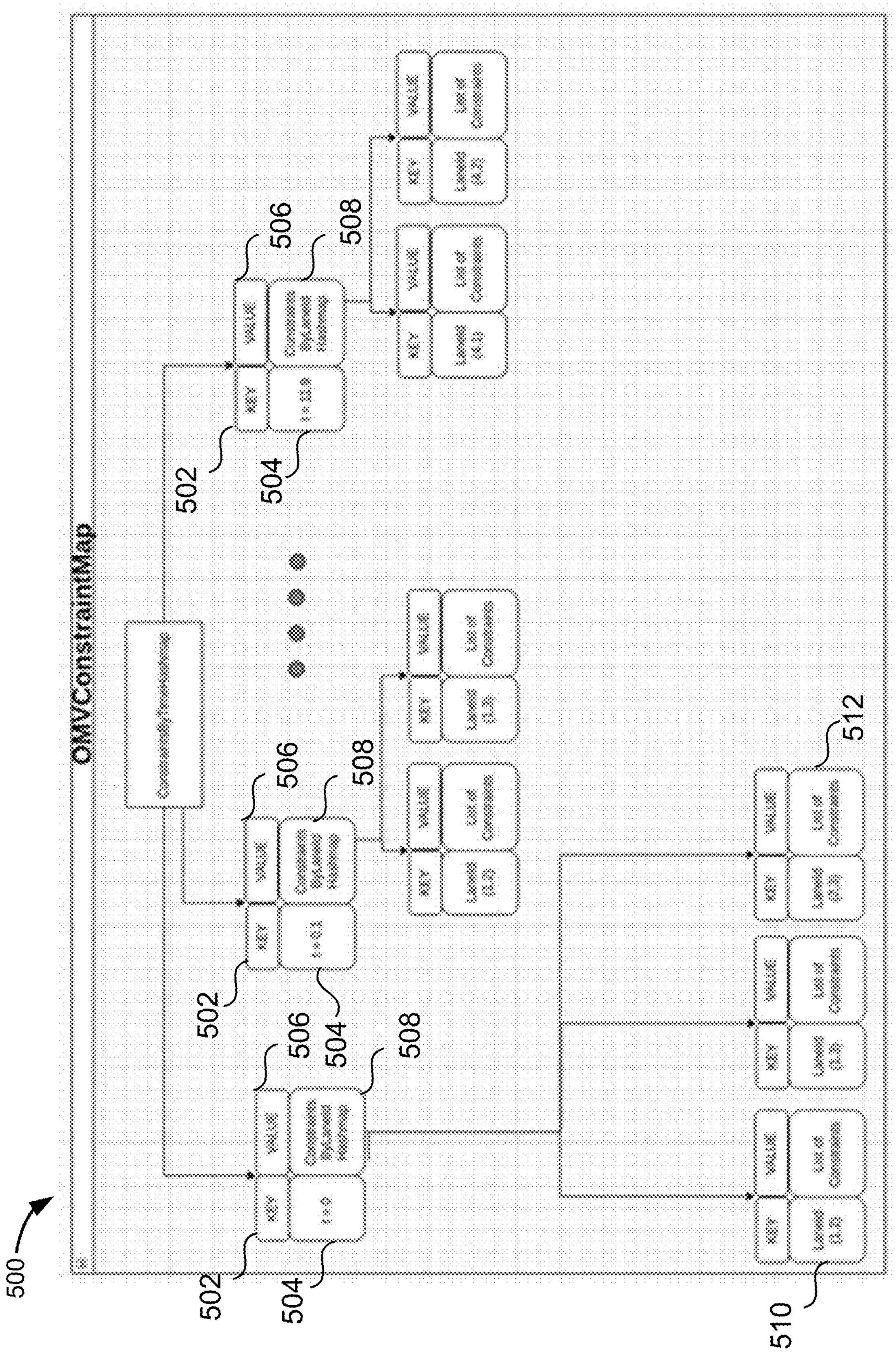
FIG. 5 is a block diagram of an OMV constraint hash map, in accordance with some aspects of the disclosure.

FIG. 5 is a block diagram representation of a hash map 500. The hash map 500 is an OMV constraint map. The hash map 500 is a hash map storing trajectory constraints, also referred to as the OMV constraints, by time. The hash map 500 includes a first plurality of key-value pairs. The key-value pairs include keys 502 associated with time steps 504. In some examples, each time step of the time steps is associated with a period of time, such as 0.1 second increments, 0.05 second increments, 0.01 second increments, etc. In further examples, the keys 502 can include time step increments (e.g., 12 seconds, 11.9 seconds, etc.) for a predetermined period of time representing a time horizon (e.g., 12 seconds, 15 seconds, 20 seconds, 30 seconds, etc.) of a motion planning process (e.g., trajectory generation of an autonomous vehicle).

The first plurality of key-value pairs includes values 506 and a nested hash map 508. The nested hash map 508 is a hash map associated with a second plurality of key-value pairs. The second plurality of key-value pairs includes keys associated with individual sections of lanes of a road (e.g., Laned 510) and values associated with a list of trajectory constraints 512 associated with the sections of lanes. Each time step 504 of the hash map 500 can include a nested hash map 508.

The list of trajectory constraints 512 can include longitudinal constraints based on one or more of the velocity, position, and acceleration of other motor vehicles. By way of example, below is an example table including a summary of data stored in a trajectory constraint data structure.

| Member Name | Member Type | Description |
|---|---|---|
| lane_id | LaneId | Unique ID of the lane that a trajectory constraint applies to |
| omv_id | unsigned int | ID of the OMV associated with the trajectory constraint |
| dist_to_start | float | Distance from the rear bumper of the OMV to the start of a section of the lane |
| omv_velocity | float | Longitudinal velocity of the OMV |
| omv_acceleration | float | Longitudinal acceleration of the OMV |

The trajectory constraint data structure (also referred to as an OMV constraint or a longitudinal OMV constraint) stores the LaneId 510 of a section of a lane to which the trajectory constraint applies. The LaneId 510 can be a data structure that stores a unique ID of the OMV that generated the trajectory constraint and a current distance along a lane from the rear bumper of the OMV to the start of a section of the lane (e.g., as shown in FIG. 4). Trajectory constraints can further be based on a relative velocity between a vehicle and an OMV and can include data associated with kinesis of the OMV (e.g., velocity, position, acceleration, jerk, pose, orientation, etc.)

In certain embodiments, the LaneId 510 is a tuple including a RoadId (e.g., a unique identifier associated with a road) and an index of a lane of the road (e.g., an index (lane number, lane section)). By way of example, the left most lane of a road has an index of 1. The index can increment moving from left to right. For example, an index (1,1) can represent a left most lane of a road at a first section of the left most lane. An index (1,2) can represent a lane right of the left most lane at a first section of the lane right of the left most lane.

The trajectory constraints are associated with predicted future states of the OMVs (e.g., the predicted future position, velocity, acceleration, etc.). In certain embodiments, the trajectory constraints are generated before a motion planner (e.g., constraint module 242, or behaviors & planning module 238) compares candidate trajectories (e.g., motion plans) violating the trajectory constraints. Generating the trajectory constraints can be performed for each of the OMVs. The trajectory constraints can be generated in chronological order for time steps of a planning horizon. For each predicted state of the OMVs, the constraint module 242 can determine an associated lane for the predicted state and compute distances between the vehicle and the OMV.

Candidate trajectories can be defined as a sequence of waypoints over a predetermined time horizon such as 12 to 15 seconds beginning with the position of a vehicle. Waypoint can include a timestamp (e.g., the time steps 504 of the keys 502) and kinesis information associated with the vehicle (e.g, pose, curvature, velocity, acceleration, etc.). Waypoints can include a lane coordinate associated with the position of the vehicle such as the LaneId 510 associated with the position of the vehicle, a distance of the waypoint from a start of a section of the lane, a distance of the waypoint from a centerline of the lane. Waypoints of candidate trajectories can be uniformly space based on time (e.g., uniformly spaced based on the time steps such as in 0.1 second increments).

The constraint module 242 or behaviors & planning module 238 can query the hash map 500 based on chronological order of the time steps 504. The constraint module, motion estimation module 234, or behaviors & planning module 238 can search (e.g., query) trajectory constraints at a time step. Searching the hash map 500 can include searching constraints from the list of trajectory constraints 512 corresponding to a lane of the waypoint (e.g., based on the LaneId 510).

The constraint module 242, motion estimation module 234, or behaviors & planning module 238 can evaluate violations of trajectory constraints of candidate trajectories. For example, the constraint module 242, motion estimation module 234, or behaviors & planning module 238 can determine violations. For example, when a bumper-to-bumper distance (B2BD) between a vehicle and an OMV, violations can be determined using the equation Violation=max(0.0, BD−B2BD) with BD being an expected buffer distance between a front bumper of the vehicle and a back bumper of the OMV.

Figure 6:
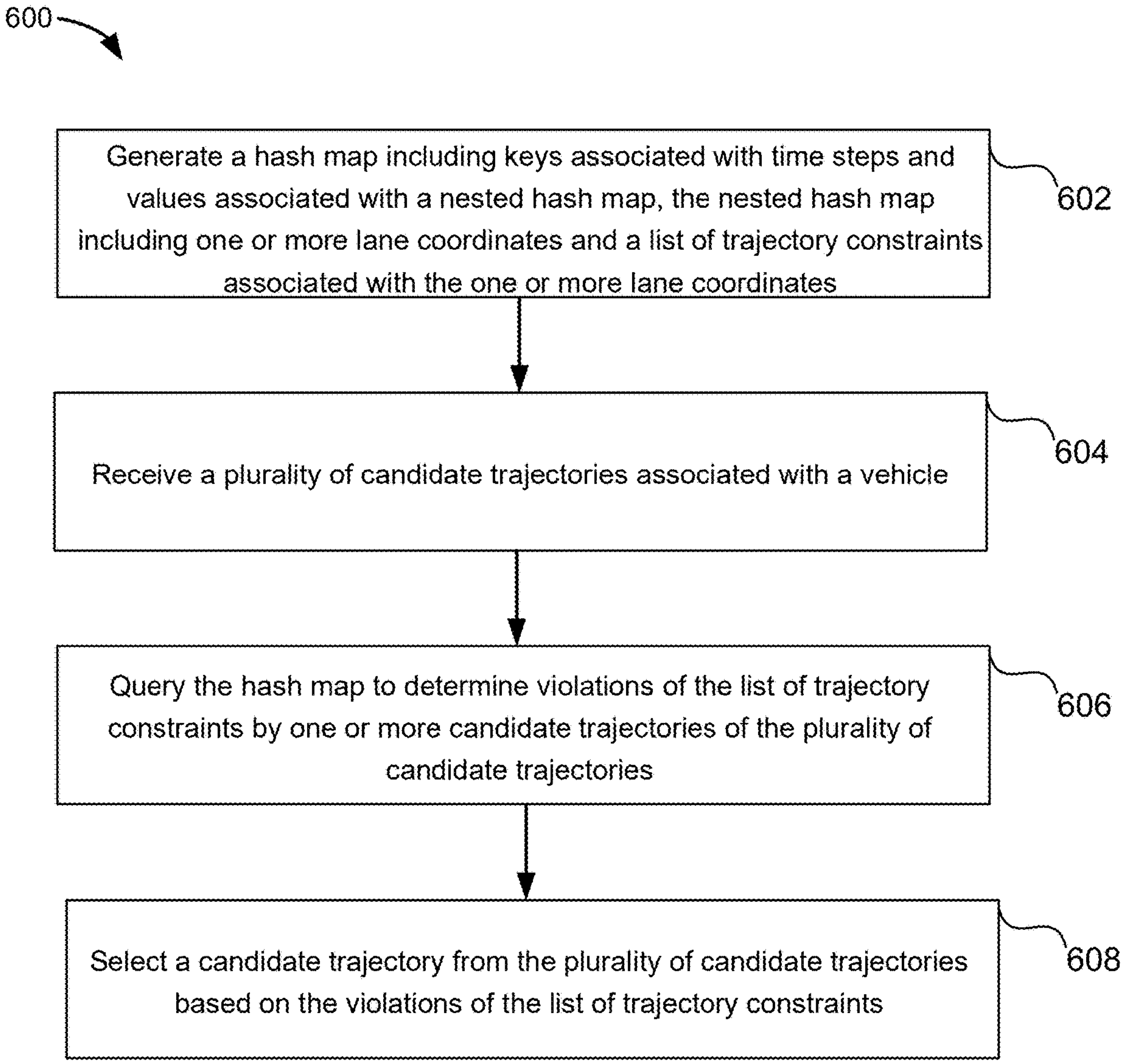
FIG. 6 is a flow diagram of an example method of candidate trajectory selection using an OMV constraint hash map, in accordance with some aspects of the disclosure.

FIG. 6 is a flow diagram of an example method 600 of candidate trajectory selection for an autonomous or semi-autonomous vehicle (e.g., the vehicle 100 of FIG. 1, the vehicle 402 of FIG. 4, etc.) using an OMV constraint hash map (e.g., the hash map 500 shown in FIG. 5). Method 600 can be performed by a computing device (e.g., the computing system 300 of FIG. 3, the autonomy computing system 200 of FIG. 2, etc.) or by a component or system (e.g., a processor, central processing unit (CPU), graphics processing unit (GPU), etc.) of the computing device.

Referring to FIG. 2 and FIG. 6, for example, autonomy computing system 200 generates 602 a hash map including keys associated with time steps and values associated with a nested hash map. For example, autonomy computing system 200 can generate a hash map such as the hash map 500 of FIG. 5. The hash map can include a first plurality of key-value pairs, with keys being associated with time steps and values being associated with the nested hash map. The nested hash map can include a second plurality of key-value pairs associated with one or more lane coordinates and a list of trajectory constraints associated with the one or more lane coordinates. For example, each lane coordinate can have a corresponding list of trajectory constraints. For example, a first lane can have an OMV operating in the first lane and a second lane can be clear of traffic, i.e., clear of OMVs. In such an example, the first lane (e.g., a lane coordinate associated with a section of the first lane) can include a list of trajectory constraints associated with the OMV operating in the first lane (e.g., a bumper-to-bumper distance constraints, lane merging distance constraints, etc.). The second lane can have different trajectory constraints than the list of trajectory constraints associated with the first lane and first lane coordinate.

Autonomy computing system 200 receives 604 a plurality of candidate trajectories associated with a vehicle. For example, the vehicle can be an autonomous or semi-autonomous vehicle. The candidate trajectories can represent motion plans of the vehicle. The candidate trajectories can include a predicted pose, curvature, velocity, and acceleration of the vehicle at each of the time steps. The candidate trajectories can include a sequence of waypoints (e.g., predicted position of the autonomous vehicle on the road at a predicted time step) over a predetermined time horizon (e.g., 12 to 15 seconds).

Autonomy computing system 200 queries 606 the hash map to determine violations of the list of trajectory constraints by one or more candidate trajectories of the plurality of candidate trajectories. For example, the computing device can query the hash map for each of the candidate trajectories and compare violations of the list of trajectory constraints to determine an extent to which trajectory constraints are violated by the one or more candidate trajectories.

Autonomy computing system 200 selects 608 a candidate trajectory from the plurality of candidate trajectories based on the violations of the list of trajectory constraints. For example, autonomy computing system 200 can select the candidate trajectory from the plurality of candidate trajectories based on the candidate trajectory violating the fewest amount of trajectory constraints. In some examples, the computing device can select the candidate trajectory based on an extent to which the trajectory constraints are violated. For example, a first candidate trajectory can violate a trajectory constraint associated with a bumper distance by one yard and a second candidate trajectory can violate the trajectory constraints associated with a bumper distance by two yards. In such an example, autonomy computing system 200 can select the candidate trajectory violating the trajectory constraint to a lesser extent (e.g., selecting the first candidate trajectory because the violation is less than the violation of the second candidate trajectory).

Figure 7:
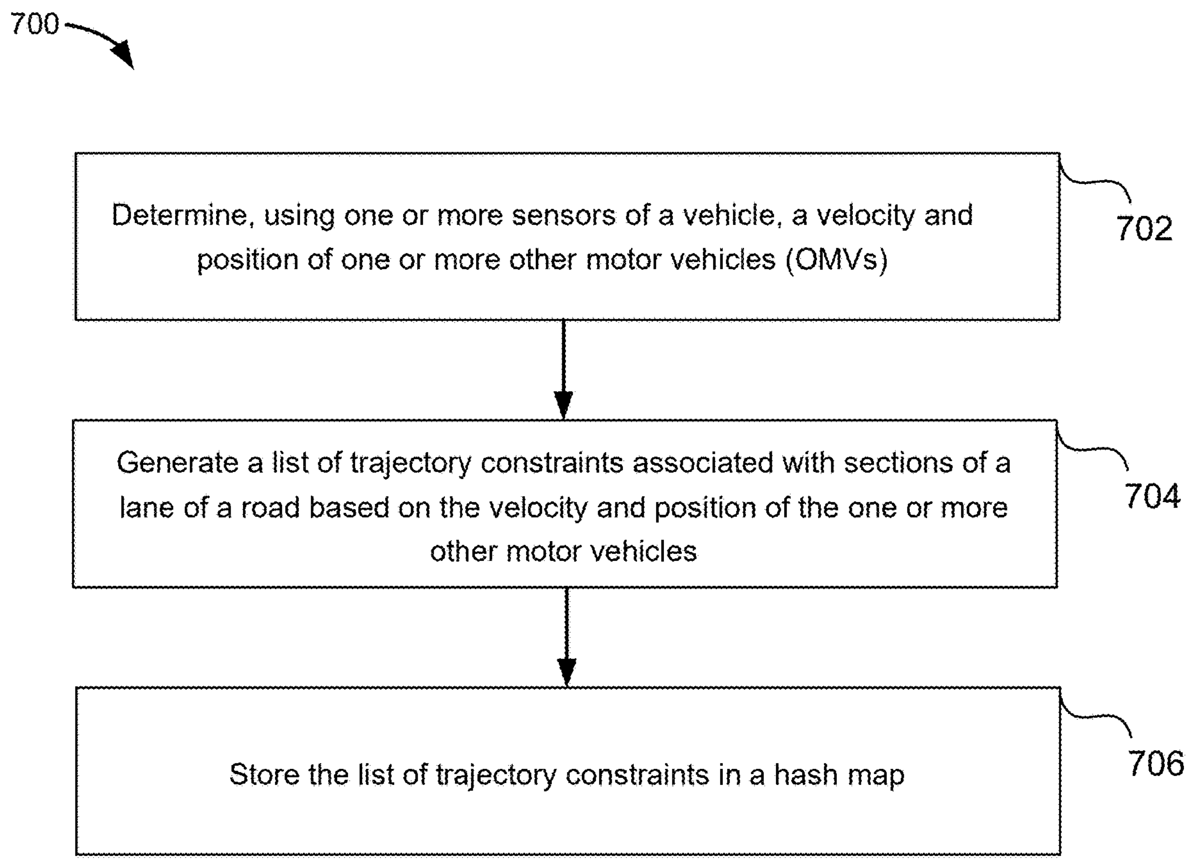
FIG. 7 is a flow diagram of another example method of generating longitudinal OMV constraints, in accordance with some aspects of the disclosure.

FIG. 7 is a flow diagram of an example method 700 of generating a hash map for motion planning for an autonomous vehicle or semi-autonomous vehicle (e.g., the vehicle 100 of FIG. 1, the vehicle 402 of FIG. 4, etc.). The hash map may be similar to, for example, the hash map 500 shown in FIG. 5. Method 700 can be performed by a computing device (e.g., the computing system 300 of FIG. 3, the autonomy computing system 200 of FIG. 2, etc.) or by a component or system (e.g., a processor, central processing unit (CPU), graphics processing unit (GPU), etc.) of the computing device.

Referring to FIG. 2 and FIG. 7, for example, autonomy computing system 200 determines, using one or more sensors of a vehicle, a velocity and position of one or more OMVs. For example, autonomy computing system 200 can determine the velocity and position of the one or more OMVs using sensors 202 of the vehicle (e.g., LIDAR, RADAR, etc.). In such an example, autonomy computing system 200 can determine the velocity and position of OMVs relative to the vehicle based on sensor data from the sensors 202.

Autonomy computing system 200 generates 704 a list of trajectory constraints associated with sections of a lane of a road based on the velocity and position of the one or more other motor vehicles. For example, the list of trajectory constraints can be determined based on the velocity and position of the OMVs. In such an example, the list of trajectory constraints can include a bumper-to-bumper distance constraint. In some examples, the bumper-to-bumper distance can increase based on the velocity (e.g., higher velocities associated with longer bumper-to-bumper distance constraint).

Autonomy computing system 200 stores 706 the list of trajectory constraints in a hash map. For example, the computing device can store the list of trajectory constraints in a hash map such as the hash map 500 of FIG. 5. In some examples, the list of trajectory constraints can be associated with a lane coordinate and time step of the hash map (e.g., the lane coordinate and time steps of FIG. 5).

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes improvements in selecting trajectories for autonomous or semi-autonomous vehicles. By querying a hash map of lane coordinates and violations associated with the lane coordinates, the methods, systems, and apparatus described herein can identify safer trajectories (e.g., trajectories with fewer trajectory constraint violations), thereby providing a safer and more comfortable passenger experience for passengers of autonomous vehicles. Further, by providing improvements in selecting trajectories for autonomous vehicles, the methods, systems, and apparatus described herein provide improvements to the technical field of autonomous driving and autonomous vehicles.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a program, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, including the implementation or utilization of components of the systems or steps independently and separately from other described components or steps. Therefore, it is manifestly intended that embodiments described herein be limited only by the claims.

What is claimed is:

1. An autonomy computing system for motion planning for a vehicle, the autonomy computing system comprising:

at least one memory configured to store machine executable instructions;

one or more processors coupled with the at least one memory and configured, upon execution of the machine executable instructions, to:

generate a hash map including keys, associated with time steps, and values associated with a nested hash map, the nested hash map including one or more lane coordinates and a list of trajectory constraints associated with the one or more lane coordinates;

receive a plurality of candidate trajectories associated with the vehicle, each of the plurality of candidate trajectories including a sequence of waypoints within a time horizon, wherein each waypoint of the sequence of waypoints includes (i) a time step, (ii) a lane coordinate associated with a position of the vehicle, and (iii) a predicted pose, curvature, velocity, and acceleration of the vehicle, and wherein the lane coordinate includes (i) a distance of the waypoint along a lane from a start of the lane, and (ii) a distance of the waypoint from a centerline of the lane;

query the hash map to determine violations of the list of trajectory constraints at the time step of each of waypoint of the sequence of waypoints of one or more candidate trajectories of the plurality of candidate trajectories, wherein the constraints of the list of trajectory constraints are based on a velocity, a position, an acceleration, or combinations thereof, of one or more other vehicles around the vehicle, and based on a predicted future state of the one or more other vehicles relative to the vehicle;

select a candidate trajectory from the plurality of candidate trajectories based on the violations of the list of trajectory constraints; and generate one or more control signals to initiate performance of the candidate trajectory.

2. The autonomy computing system of claim 1, wherein the time steps are divisions of the time horizon of the plurality of candidate trajectories.

3. The autonomy computing system of claim 1, wherein the list of trajectory constraints includes at least one of: a bumper-to-bumper distance constraint, a lane merging distance constraint, and a velocity constraint.

4. The autonomy computing system of claim 1, wherein the one or more lane coordinates includes a road identifier and an index representing a section of a lane of a road associated with the road identifier.

5. The autonomy computing system of claim 4, wherein the one or more lane coordinates are associated with an absolute location of the section of the lane.

6. The autonomy computing system of claim 1, wherein the list of trajectory constraints is based on a velocity or an acceleration of the vehicle.

7. A method for motion planning for a vehicle, the method comprising:

generating a hash map including keys associated with time steps and values associated with a nested hash map, the nested hash map including one or more lane coordinates and a list of trajectory constraints associated with the one or more lane coordinates;

receiving a plurality of candidate trajectories associated with the vehicle, each of the plurality of candidate trajectories including a sequence of waypoints within a time horizon, wherein each waypoint of the sequence of waypoints includes (i) a time step, (ii) a lane coordinate associated with a position of the vehicle, and (iii) a predicted pose, curvature, velocity, and acceleration of the vehicle, and wherein the lane coordinate includes (i) a distance of the waypoint along a lane from a start of the lane, and (ii) a distance of the waypoint from a centerline of the lane;

querying the hash map to determine violations of the list of trajectory constraints at the time step of each of waypoint of the sequence of waypoints of one or more candidate trajectories of the plurality of candidate trajectories, wherein the constraints of the list of trajectory constraints are based on a velocity, a position, an acceleration, or combinations thereof, of one or more other vehicles around the vehicle, and based on a predicted future state of the one or more other vehicles relative to the vehicle;

selecting a candidate trajectory from the plurality of candidate trajectories based on the violations of the list of trajectory constraints; and generating one or more control signals to initiate performance of the candidate trajectory.

8. The method of claim 7, wherein the time steps are divisions of the time horizon of the plurality of candidate trajectories.

9. The method of claim 7, wherein the list of trajectory constraints includes at least one of: a bumper-to-bumper distance constraint, a lane merging distance constraint, and a velocity constraint.

10. The method of claim 7, wherein the one or more lane coordinates includes a road identifier and an index representing a section of a lane of a road associated with the road identifier.

11. The method of claim 10, wherein the one or more lane coordinates are associated with an absolute location of the section of the lane.

12. The method of claim 7, wherein the list of trajectory constraints are based on a velocity or an acceleration of the vehicle.

13. A non-transitory computer-readable medium having stored thereon instructions that, when executed by at least one processor, cause the at least one processor to:

generate a hash map including keys associated with time steps and values associated with a nested hash map, the nested hash map including one or more lane coordinates and a list of trajectory constraints associated with the one or more lane coordinates;

receive a plurality of candidate trajectories associated with a vehicle, each of the plurality of candidate trajectories including a sequence of waypoints within a time horizon, wherein each waypoint of the sequence of waypoints includes (i) a time step, (ii) a lane coordinate associated with a position of the vehicle, and (iii) a predicted pose, curvature, velocity, and acceleration of the vehicle, and wherein the lane coordinate includes (i) a distance of the waypoint along a lane from a start of the lane, and (ii) a distance of the waypoint from a centerline of the lane;

query the hash map to determine violations of the list of trajectory constraints at the time step of each of waypoint of the sequence of waypoints of one or more candidate trajectories of the plurality of candidate trajectories, wherein the constraints of the list of trajectory constraints are based on a velocity, a position, an acceleration, or combinations thereof, of one or more other vehicles around the vehicle, and based on a predicted future state of the one or more other vehicles relative to the vehicle;

select a candidate trajectory from the plurality of candidate trajectories based on the violations of the list of trajectory constraints; and generate one or more control signals to initiate performance of the candidate trajectory.

14. The non-transitory computer-readable medium of claim 13, wherein the time steps are divisions of the time horizon of the plurality of candidate trajectories.

15. The non-transitory computer-readable medium of claim 13, wherein the list of trajectory constraints includes at least one of: a bumper-to-bumper distance constraint, a lane merging distance constraint, and a velocity constraint.

* * * * *